(12) United States Patent
Gúilard et al.

(10) Patent No.: US 6,174,505 B1
(45) Date of Patent: Jan. 16, 2001

(54) POLYAZACYCLOALKANES, TRI-, TETRA- OR PENTA-AZAMACROCYCLIC COMPLEXES, PROCESSES FOR THE PRODUCTION OF THESE SUBSTITUTED OR UNSUBSTITUTED POLYAZACYCLOALKANES GRAFTED TO A SUPPORT AND USES OF POLYAZACYCLOALKANES AND THE AFOREMENTIONED COMPLEXES

(75) Inventors: Roger Gúilard, Fontaine les Dijon; Hervé Chollet, Asnieres les Dijon; Philippe Guiberteau, Messigny et Vantoux; Panayotis Cocolios, Le Chesnay, all of (FR)

(73) Assignee: Commissariat a l'Energie Atomique (FR)

( * ) Notice: Under 35 U.S.C. 154(b), the term of this patent shall be extended for 0 days.

(21) Appl. No.: 09/189,805

(22) Filed: Nov. 12, 1998

Related U.S. Application Data

(62) Division of application No. 08/646,330, filed on Apr. 25, 1997, now Pat. No. 5,891,574.

(30) Foreign Application Priority Data

Oct. 5, 1994 (FR) .................................................. 94 11904

(51) Int. Cl.⁷ .................................................. C01B 13/00
(52) U.S. Cl. .......................... 423/219; 540/465; 540/474; 525/375; 526/261
(58) Field of Search ..................................... 540/465, 474; 423/219; 525/375; 526/261

(56) References Cited

U.S. PATENT DOCUMENTS

| | | | | |
|---|---|---|---|---|
| 4,168,265 | * | 9/1979 | Tabushi et al. | 525/375 |
| 4,174,428 | * | 11/1979 | Tabushi et al. | 423/24 |
| 5,120,443 | | 6/1992 | Bruening et al. | 210/638 |
| 5,141,966 | * | 8/1992 | Porath | 521/32 |

FOREIGN PATENT DOCUMENTS

| | | | |
|---|---|---|---|
| 287436 | * | 10/1988 | (EP) . |
| 0 306 334 | | 3/1989 | (EP) . |
| 0 437 875 | | 7/1991 | (EP) . |
| 2 613 718 | | 10/1988 | (FR) . |
| WO89/12119 | | 12/1989 | (WO) . |
| WO96/11056 | | 4/1996 | (WO) . |

OTHER PUBLICATIONS

Szczepaniak, et al., "Synthesis and properties of a Chelating Resin Containing a Macrocyclic Tetraaza System as Active Group," *Elsevier Science Publishers* (*Reactive Polymers*)—vol. 3, pp. 101–106 (1985), no month.

Spirlet, et al., "Crystal and Molecular Structure of Sodium Aquo (1, 4, 7, 10–Tetraazacyclododecane–1, 4, 7, 10–tetraacetato) europate (III) Tetrahydrat, Na+ (EuDOTA–H$_2$O)⁻·4H$_2$), and its Relevance to NMR Studies of the Conformational Behavior of the Lanthanide Complexes Formed by the Macrocyclic Liagand DOTA," *Inorg. Chem.* vol. 23, pp. 359–363 (1984), no month.

Dubost, et al., "Structure d'un agent de contraste utilisé en imagerie de résonance magnétique le complexe DOTA Gd C$_{16}$H$_{24}$N$_4$O$_8$NaGd, 5H$_2$O," *C.R. Acad Sci.*—vol. 11, pp. 349–354 (1991), no month.

Bagnoud, et al., "Outer–Sphere Ligand–Exchange Chromatography with Copper–Loaded Macrocyclic–Bonded Silica Column," *Chromatographia*, vol. 29 (9/10), pp. 495–499 (1990), no month.

\* cited by examiner

*Primary Examiner*—Tom Dunn
(74) *Attorney, Agent, or Firm*—Burns, Doane, Swecker & Mathis L.L.P.

(57) ABSTRACT

The invention relates to polyazacycloalkanes having 3, 4 or 5 nitrogen atoms, tri-, tetra- or penta-azamacrocyclic transition metal complexes and processes for the production of said polyazacycloalkanes.

Figure 1:
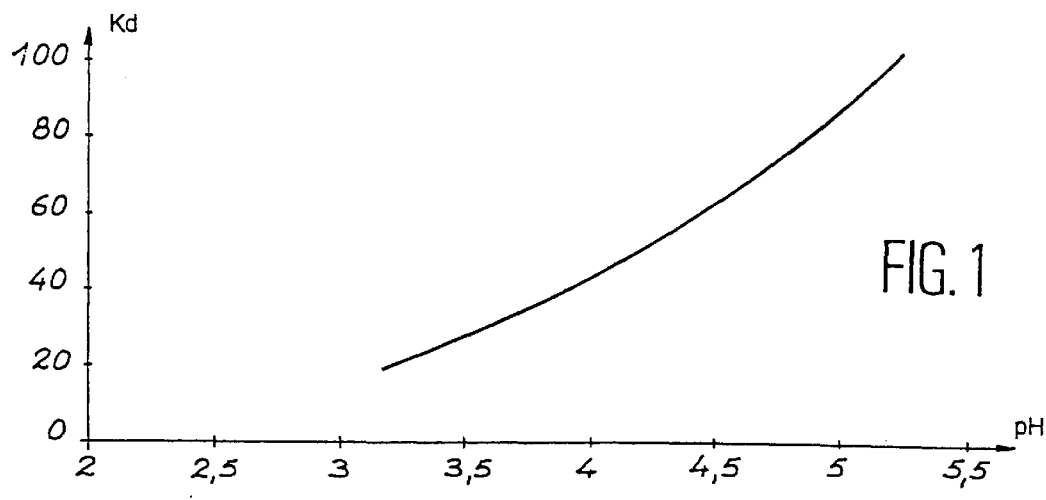

The object of the invention is to form polyazacycloalkanes able to trap metal cations and in particular U, Pu, Am, Ce, Eu, Al, Gd, Cr, Mn, Fe, Co, Ni, Cu, Zn, Ag, Cd, Sn, Au, Mg or Pb or complexes able to trap in particular oxygen in a gaseous mixture.

The invention more particularly applies to the treatment of liquid effluents from nuclear power stations.

6 Claims, 5 Drawing Sheets

POLYAZACYCLOALKANES, TRI-, TETRA- OR PENTA-AZAMACROCYCLIC COMPLEXES, PROCESSES FOR THE PRODUCTION OF THESE SUBSTITUTED OR UNSUBSTITUTED POLYAZACYCLOALKANES GRAFTED TO A SUPPORT AND USES OF POLYAZACYCLOALKANES AND THE AFOREMENTIONED COMPLEXES

This application is a divisional of application Ser. No. 08/646,330, filed Apr. 25, 1997 now U.S. Pat. No. 5,891,574.

The present invention relates to polyazacycloalkanes, tri-, tetra- or penta-azamacrocyclic complexes, a process for the production of substituted or unsubstituted polyazacycloalkanes, grafted either to an organic polymer, or to a silica gel and the use of such grafted polyazacycloalkanes in the elimination of the metal cations present in a liquid, which can be an effluent, and polyazacycloalkane complexes in the separation of dioxygen from air.

At present, the effluents of irradiated nuclear fuel reprocessing plants and technological effluents of nuclear power stations are treated in an industrial evaporation tower, i.e. a plate column in which distillation takes place under reduced pressure. Such a procedure makes it possible to deplete effluents having a low α concentration, i.e. for the C.E.A. (COMMISSARIAT A L'ENERGIE ATOMIQUE) centre at VALDUC, effluents having a contamination in α elements below $1.5.10^7$ Bq/m and in saline charge below 50 g/l. This gives a concentrate containing virtually all the α activity and a saline charge of approximately 300 g/l. This concentrate is treated and subsequently conditioned in concrete. This procedure also makes it possible to bring evaporates consisting of 90% of the aqueous phase of the treated effluents to an activity of 300 to 500 Bq/m³, i.e. well below the discharge value permitted at present (1000 Bq/m³). This procedure has hitherto permitted the discharge of these effluents into the environment following monitoring of the toxic, radiological and chemical elements.

However, as from 1994, the new standards imposed with respect to the discharge into the environment of effluents have become much more strict. Thus, for the Valduc C.E.A. centre, any effluent discharge must have a maximum α 3 contamination of 1 Bq/m³. Therefore, said effluents must be completely purified in order to bring about a "zero" discharge into the environment.

The existing evaporation procedure does not make it possible to satisfy the new discharge standard, because it is not possible to eliminate the phenomenon of entraining α contamination to the vapour. Therefore this procedure is not sufficiently effective and leads to the obtaining of very slightly charged solutions with a radioactive activity between 200 and 300 Bqα/m³ (below 1000 Baα/m³).

It is therefore necessary to develop complexing agents permitting the treatment of evaporates from industrial evaporation towers in order to eliminate the final traces of α emitting elements. In addition, these complexing agents could also be used for treating effluents upstream of the industrial evaporation tower, so as to be able to optionally replace the latter, whilst still obtaining effluents having activity levels in accordance with the new environmental discharge standards.

The prior art discloses macrocyclic compounds having excellent complexing properties with respect to cations, anions or even neutral molecules. Thus, FR 2 643 370 in the name of Air Liquide describes derivatives of the following general formula:

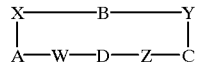

in which A, B, C and D can represent $—(CH_2)_x—$, x being between 1 and 4 and W, X, Y and Z representing $=N—(CH_2)_y—COR$, y being between 1 and 4 and R representing an OH, $NH_2$ or OR' group. These derivatives can be used as complexing agents of metallic elements and in complexed form as oxygen traps.

However, these macrocyclic derivatives are generally highly soluble in water. Therefore the use, recovery and regeneration of said derivatives in solution are not very easy. For these reasons, several fixing methods have been developed in order to graft these macrocyclic derivatives to organic or inorganic supports which are not soluble in water. Thus, U.S. Pat. No. 4,943,375 discloses a macrocycle grafted on silica usable in a separation column for trapping a given ion present in a solution of several ions.

French patent application 2 613 718 describes cyclic tetramines grafted on a polymer and usable for the selective extraction and/or dosing of ions of transition metals and heavy metals. However, these grafted macrocycles suffer from the disadvantage of not being selective of a particular type of metals.

In the nuclear sector, European patent application 347 315 describes a process for separating, by means of crown ethers, uranium and plutonium present in an aqueous fuel resulting from the reprocessing of irradiated nuclear fuels. The crown ether can be DCH 18C6, DCH 24Cri or DB 18C6.

There are a priori numerous applications for said modified polymers, such as e.g. the trapping of metallic elements contained in effluents, the purification of organic solvents contaminated by various cations produced in the electronics industry (cf. C. Pong, "Polymer material for electronic applications", E. D. Felt, C. W. Wilkin, Eds: ACS Symposium Series 184, American Chemical Society, Washing D.C., 1982, pp 171–183) or the use of silica gels 4 modified by copper complexes in liquid phase chromatography (cf. M. A. Bagnoud, W. Haerdi, J. L. Veuthey, Chromatographia, 1990, 29, (9/10) pp 495–499). A particularly interesting application relates to the selective coordination properties of gaseous molecules ($O_2$° $CO_2$) of a certain number of complexes formed by these macromolecules with Co(II), Fe(II), Mn(II), Cu(II), etc.

During the last decade a novel dioxygen production process has been developed. Using as a basis natural dioxygen transportation systems (hemoglobin, hemocyanin), it is performed in solution. This process essentially uses $Co^{II}$, $Fe^{II}$, and $Cu^{II}$ complexes of tetraazamacrocycles, Schiff bases or porphyrins. The latter selectively fix dioxygen from the air and the desorption stage can be performed electrochemically. This process in solution is usually limited by the life of the oxygenated complexes, which are subject to irreversible degradation reactions by acid hydrolysis in order to form inert complexes no longer having an affinity for dioxygen.

However, it has been demonstrated that the grafting of complexes able to coordinate dioxygen on organic or inorganic, solid matrixes would make it possible to cancel out the decomposition process observed in solution, cf. e.g. the article by J. P. Collman et al, J. Am. Chem. Soc., 1973, 95, 2048 or the article by J. H. Fuhrhop et al, J. Macromol.

Sci. Chem., 1979, A13, 545. Moreover, a sufficiently low concentration of grafted complexes adequately moves away the metal centres to prevent any formation of binuclear species. The choice of a relatively hydrophobic polymer reduces the water content of the matrix and therefore the hydrolysis of the oxygenated complex.

The invention aims at removing the disadvantages of the prior art.

To this end, the invention relates to polyazacycloalkanes, characterized in that they comply with one of the three following formulas (I), (II) or (III):

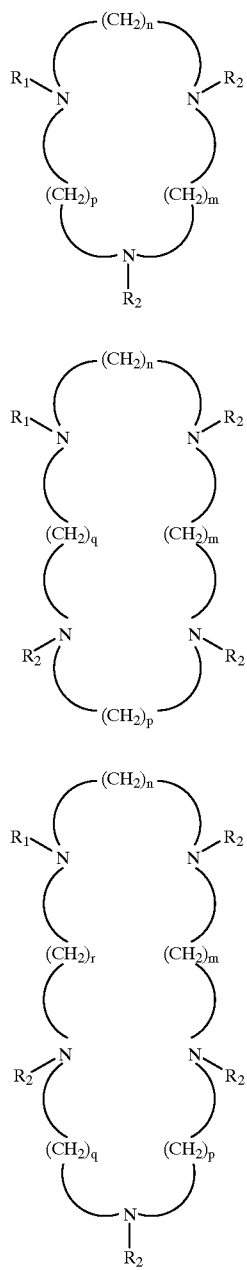

(I)

(II)

(III)

in which n, m, p, q and r, which can be the sane or different, are equal to 2 or 3, $R_1$ is a solid support, $R_2$ represents the hydrogen atom or the group $(CH_2)_2-R_3$, $R_3$ being a functional group chosen from within the group constituted by COOH, $CONH_2$, $CH_2OH$, CN or $COOR_4$, $R_4$ representing an alkyl or benzyl group, or $R_2$ represents the group $-(CH_2)-R_5$, $R_5$ representing COOH or $PO_3R_6$, $R_6$ representing an alkyl or hydrogen group, with the exclusion (a) of polyazacycloalkanes of formula (II) in which $R_1$ represents a solid support derived from silica and complying with the formula:

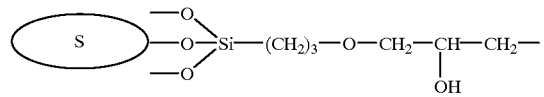

S representing a silica gel, each $R_2$ represents the hydrogen atom and (i) n and p are equal to 2 and m and q are equal to 3 or (ii) n and p are equal to 3 and m and q are equal to 2 and (b) polyazacycloalkanes of formula (I) in which $R_1$ represents a solid support consisting of an organic polymer and each $R_2$ represents the hydrogen atom.

The silica gels S as used in the invention are defined by KIRK-OTHMER, Encyclopedia of Chemical Technology, third edition, vol. 20, pp 773–775.

The document by M. A. Bagnoud et al, "Outer-sphere ligand-exchange chromatography with copper loaded macrocyclic-bonded silica column", Chromatographia, 1990, 29, 9/10, pp 495–499 discloses the excluded compound (a), whilst document FR-A-2 613 718 discloses the excluded compound (b).

The solid support can be a crosslinked or non-crosslinked, organic polymer and in particular a radical of a crosslinked or non-crosslinked, organic polymer having an alkyl halide or alkyl chloride termination, such as a radical of a chloromethylated polystyrene of formula:

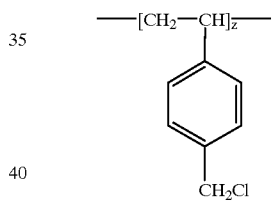

or can be a derivative of silica complying with the formula:

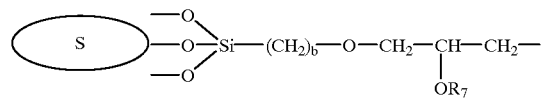

or the formula:

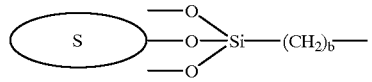

S representing a silica gel, b being between 1 and 4 and preferably equal 3 and $R_7$ being an alkyl group or a hydrogen atom.

The term crosslinked or non-crosslinked, organic polymer with an alkyl halide termination means a polymer, whose halogen or halogens have been totally or partly substituted.

Preferably, the grain size of the chloromethylated polystyrene and that of the solid support derived from silica are between 20 and 400 mesh, and Preferably between 20 and 70 mesh. This is the grain size of the chloromethylated polystyrene and not that of the radical, which can differ.

When all the nitrogen atoms of the different macrocycles are substituted by propionate groups, these macrocycles have remarkable properties of complexing metals of the lanthanide and actinide series and in particular the europium and gadolinium series. An X-ray analysis shows that the coordination of the metal atom with the macrocycle is performed by oxygen atoms of the carboxylate groups, whereas close macrocycles e.g. described in the article by Spirlet et al, Inorg. Chem. 1984, pp 359–363 or in the article by Dubost et al, C. R. Acad. Sci., Paris Ser. 2, 1991, 312, pp 349–354 have the metal atom coordinated both with nitrogen and oxygen atoms. This result is due to the nature of the groups carried on the nitrogen atoms of the macrocycles according to the invention. As $R_1$ is a solid support, the macrocycles can be used in effluent treatment processes using extraction columns.

Thus, when the solid support is a silica gel, the product obtained has a reduced cost, can easily be regenerated by a simple acid treatment, is stable in most organic solvents and is inert with respect to numerous chemical products. This product can also be used under pressure and in a combustion supporting or oxidizing medium.

When the solid support is of the Merrifield (registered trademark) resin type marketed by Aldrich, the product obtained i<; physiologically inert and can be used as a selective complexing agent of blood elements, e.g. for the elimination of the cation $Cu^{2+}$ in a dialysis treatment.

The invention also relates to a process for the production of a substituted polyazacycloalkane grafted on a solid support and consisting of reacting an excess of $CH_2=CH-R_3$, $R_3$ being a functional group chosen from among —COOH, —CONH$_2$, —CH$_2$—OH, —CN or —COOR$_4$, $R_4$ being an alkyl or benzyl group, in the presence of a polar solvent such as ethanol, preferably absolute ethanol, with polyazacycloalkane grafted on a solid support $R_1$, complying with one of the following formulas (VII), (VIII) or (IX):

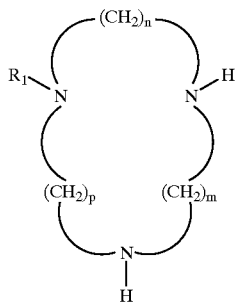

(VII)

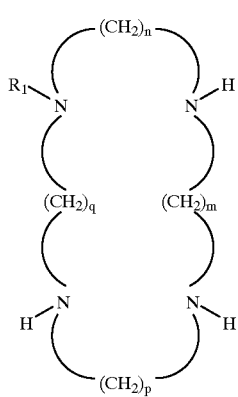

(VIII)

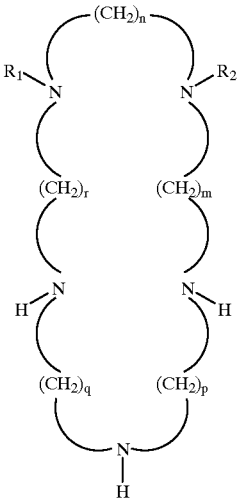

(IX)

in which n, m, p, q or r, which can be the same or different, are equal to 2 or 3 and $R_1$ is a solid support on which is grafted the nitrogen atom and chosen from among crosslinked or non-crosslinked, organic polymer, preferably a radical of such a polymer having an alkyl halide termination of the Merrifield (registered trademark) type or a silica derivative complying with one of the two aforementioned formulas, so as to obtain a polyazacycloalkane grafted on a substituted, solid support corresponding respectively to one of the following formulas (X), (XI) and (XII):

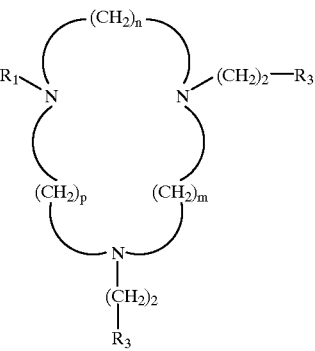

(X)

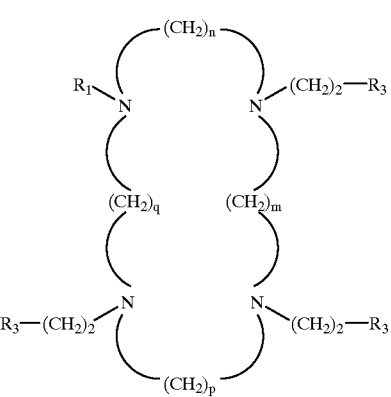

(XI)

(XII)

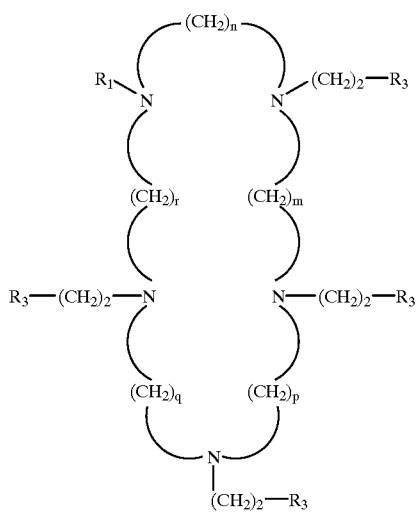

(XIV)

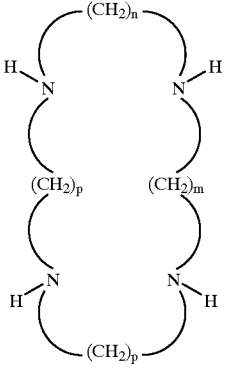

in which n, m, p, q, r, $R_1$ and $R_3$ have the same meanings as hereinbefore.

The invention also relates to the process for grafting an unsubstituted polyazacycloalkane on a solid support of the silica gel type.

According to a first embodiment of the process, reaction takes place in the presence of an aprotic solvent, e.g. such as xylene and under reflux heating:

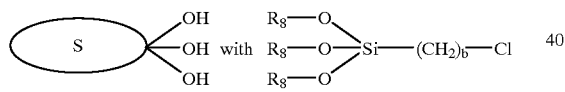

S representing a silica gel, $R_8$ being an alkyl group and b being between 1 and 4, preferably equal to 3, with a polyazacycloalkane P, P complying with one of the three following formulas (XIII), (XIV) or (XV):

(XIII)

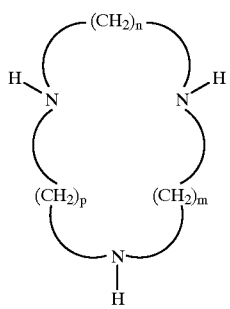

(XV)

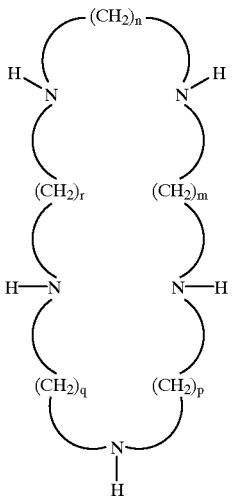

in which n, m, p, q and r, which can be the same or different, are equal to 2 or 3, so as to obtain grafted polyazacycloalkanes of formula:

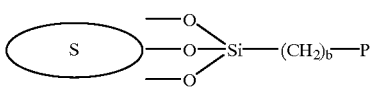

in which S represents a silica gel and b and P have the same meanings as hereinbefore.

According to a second embodiment of the process, reaction takes place in the presence of an aprotic solvent such as e.g. toluene and under reflux heating:

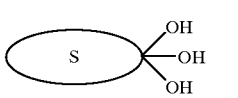

with

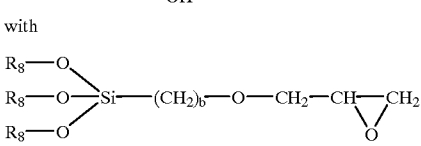

S representing a silica gel, $R_8$ being an alkyl group and b being between 1 and 4 and preferably equal to 3, the product obtained then reacting in the presence of water under reflux heating with a polyazacycloalkane P, P complying with one of the following three formulas (XIII), (XIV) or (XV):

(XIII)

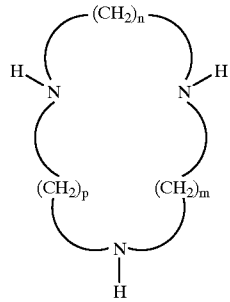

(XIV)

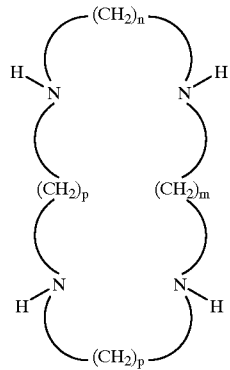

(XV)

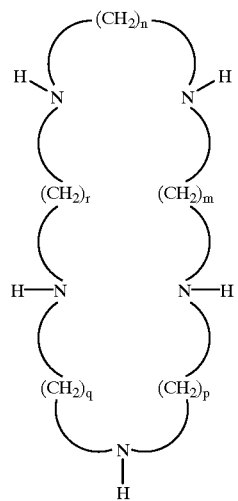

in which n, m, p, q and r, which can be the same or different, are equal to 2 or 3, whilst excluding the case where b=3 and where polyazacycloalkane has the formula (XIV) in which (i) n and p are equal to 2 and m and q are equal to 3 or (ii) n and p are equal to 3 and m and q are equal to 2, so as to obtain the grafted polyazacycloalkane of formula:

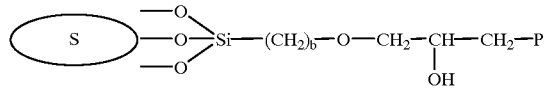

in which S represents a silica gel and P and b have the same meanings as hereinbefore.

The document M. A. Bagnoud, W. Haerdi, J. L. Veuthey, Chromatographia, 1990, 29, 9/10, pp 495–499 already discloses the process for the preparation of grafted polyazacycloalkane corrsponding to the exclusion.

The invention also relates to tri-, tetra- or penta-azamacrocyclic complexes of transition metals complying with one of the following formula (IV), (V) or (VI):

(IV)

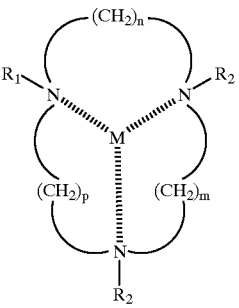

(V)

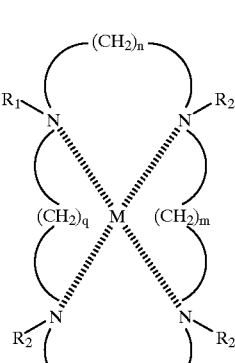

(VI)

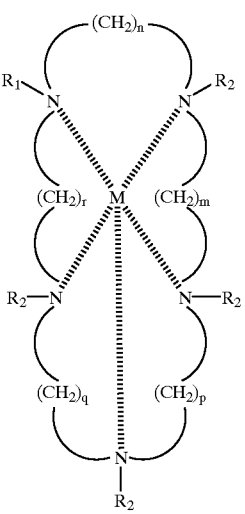

in which n, m, p, q and r, which can be the same or different, are equal to 2 or 3, M is a transition metal chosen from among Ti, Mn, Fe, Co, Ni, Cu, Ru, Rh and Ir, $R_1$ is a solid support of the crosslinked or non-crosslinked, organic polymer type and preferably a radical of such a polymer with an alkyl halide termination or a silica derivative complying with the formula:

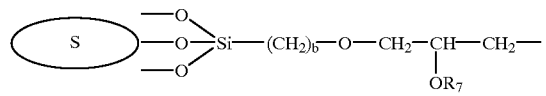

or the formula:

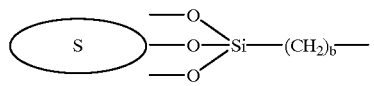

S representing a silica gel, b being between 1 and 4 and preferably equal to 3 and $R_7$ being an alkyl group or a hydrogen atom, and $R_2$ represents the hydrogen atom or the group $(CH_2)_2$—$R_3$, $R_3$ being a functional group chosen from within the group constituted by COOH, $CONH_2$, $CH_2OH$, CN or $COOR_4$, $R_4$ representing an alkyl or benzyl group or $R_2$ represents $(CH_2)$—$R_5$, $R_5$ representing COOH or $PO_3R_6$, $R_6$ representing hydrogen or an alkyl group.

These complexes can be used in processes for the separation or purification of gases, but also during catalytic reactions using gaseous molecules such as $O_2$, CO, $CO_2$ or NO.

Such complexes and more particularly those based on cobalt can also be used in the conditioning of foods, e.g. maintaining an oxygen-free atmosphere.

Finally, the invention relates to the use of a polyazacycloalkane according to the invention for the elimination of the metal cations contained in a liquid such as an effluent or the copper or aluminium contained in a biological fluid such as blood. Such cations are preferably cations of transition metals, heavy metals, metals of group IIIa, lanthanides or actinides and in particular U, Pu, Am, Ce, Eu, Gd, Al, Cr, Mn, Fe, Co, Ni, Cu, Zn, Ag, Cd, Sn, Au, Hg or Pb.

Finally, the invention relates to the use of the aforementioned complexes in the elimination of oxygen from a mixture of gases containing oxygen.

The invention will be better understood from reading the following description of a preferred embodiment of the invention give n in an illustrative and non-limitative manner and with reference to the attached drawings, wherein show:

FIG. 1 A graph illustrating the evolution of the partition coefficient Kd as a function of the pH for a synthetic uranyl nitrate solution.

Figure 2:
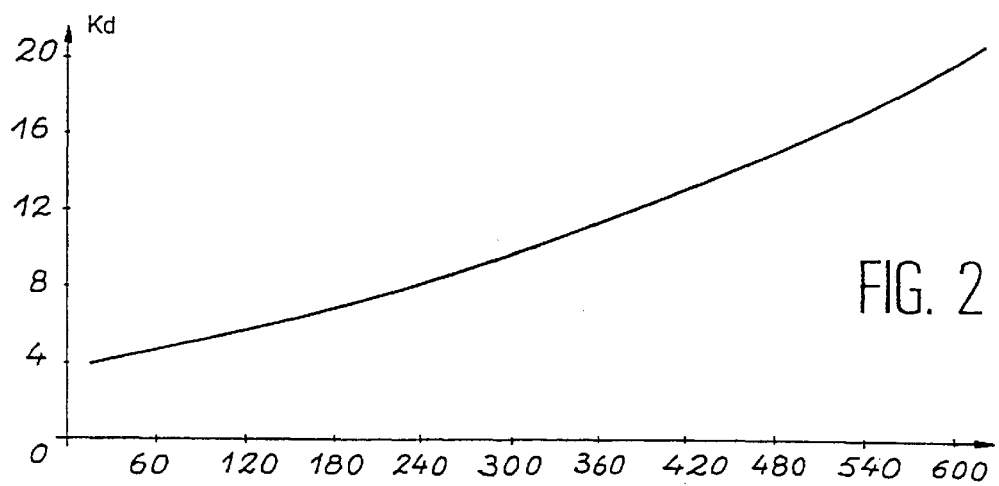

FIG. 2 A graph illustrating the evolution of the partition coefficient Kd as a function of the stirring time for a synthetic uranyl nitrate solution.

Figure 3:
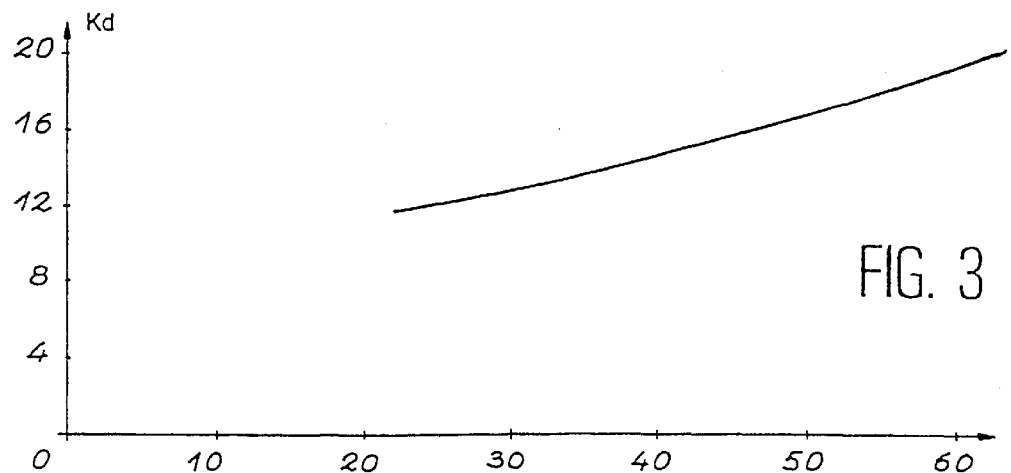

FIG. 3 A graph illustrating the evolution of the partition coefficient Kd as a function of the temperature for a synthetic uranyl nitrate solution.

Figure 4:
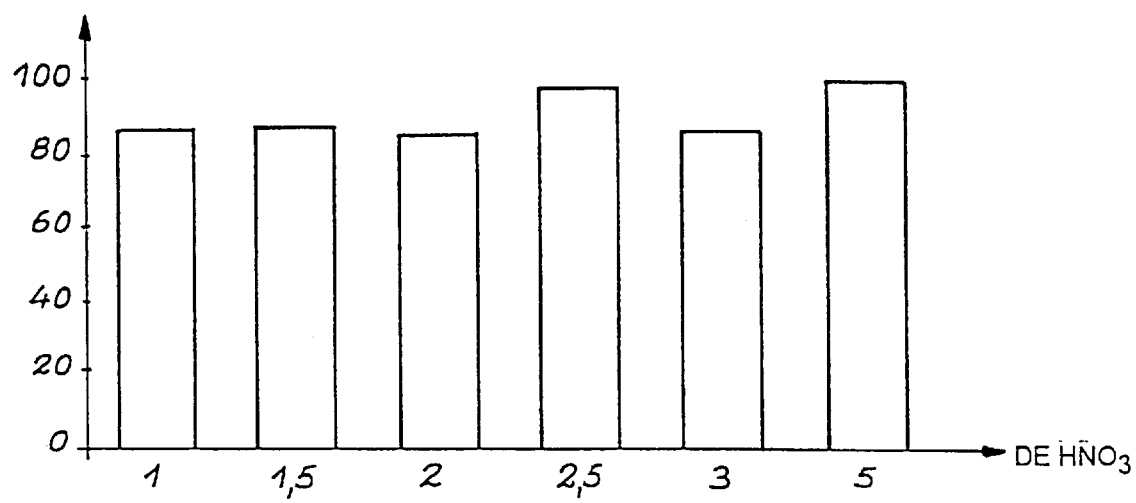
Figure 5:
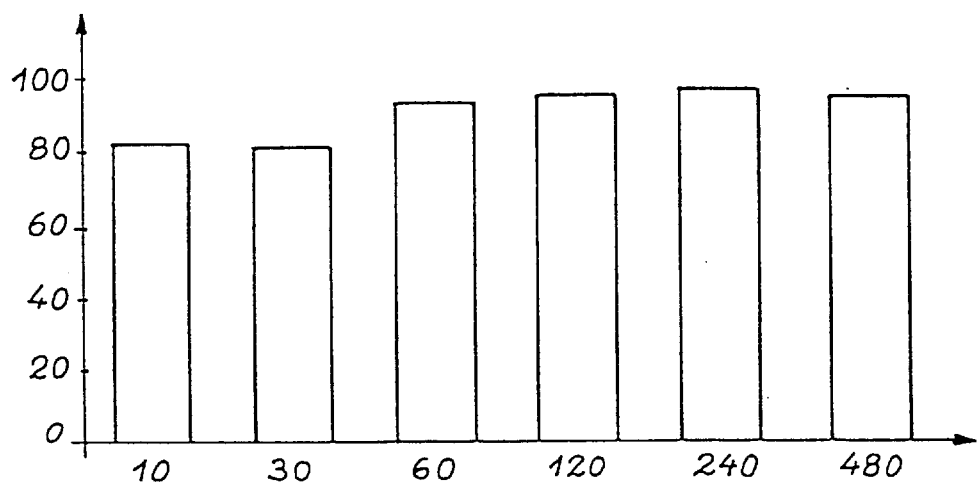

FIGS. 4 & 5 The uranium percentage eluted from a polyazacycloalkane according to the invention respectively as a function of the normality of the nitric acid used or the contact time between said polyazacycloalkane and said acid.

Figure 6:
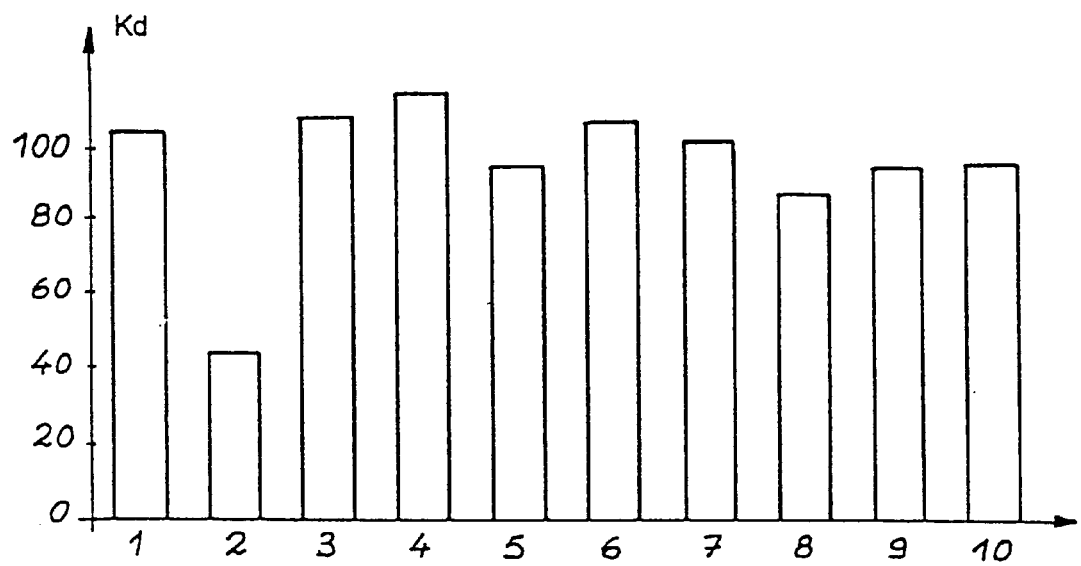

FIG. 6 The evolution of the partition coefficient Kd of uranium 238 fixed to a polyazacycloalkane according to the invention over 10 extraction cycles.

Figure 7:
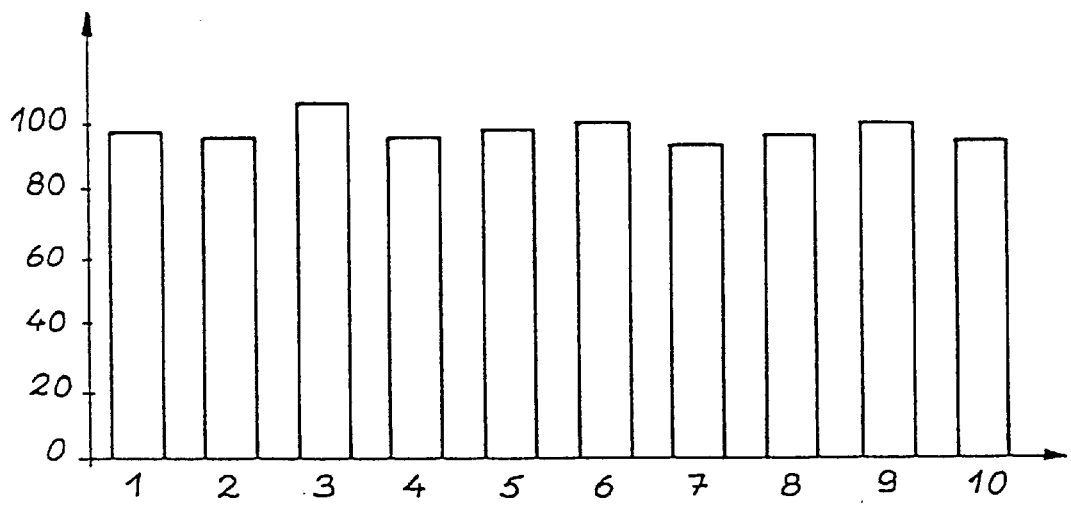

FIG. 7 The uranium 238 percentage eluted on 10 elution cycles.

Figure 8:
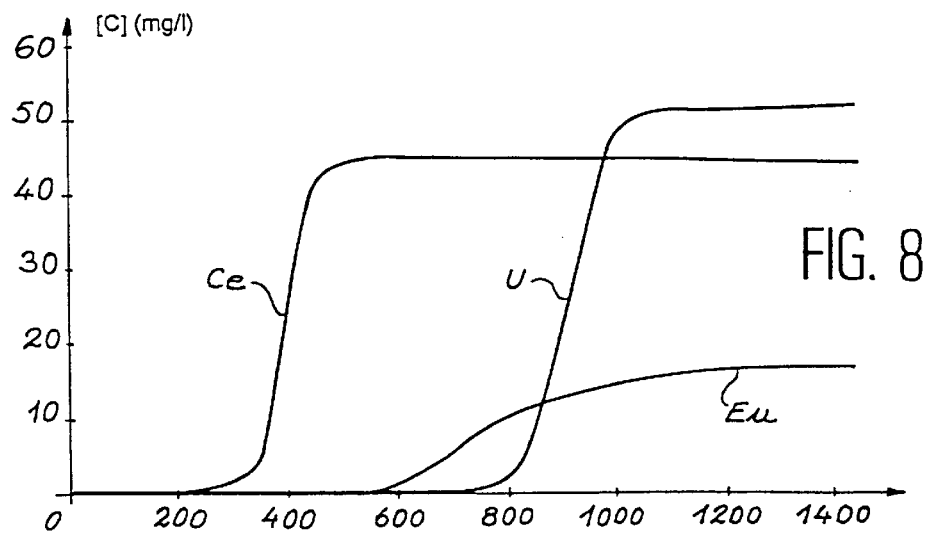

FIG. 8 The evolution of the content of three cations (Ce, U, Eu) at the exit from a column filled with a polyazacycloalkane according to the invention, as a function of the initial solution volume, which has flown out in said column.

Figure 9:
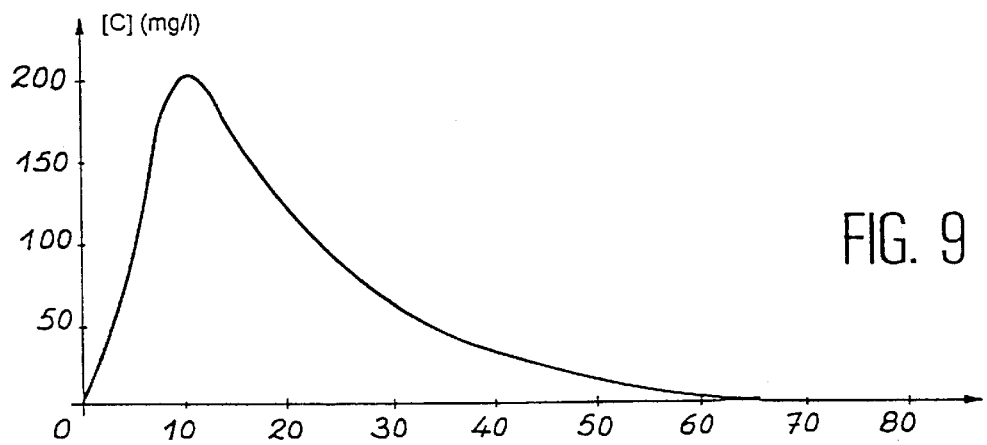
Figure 10:
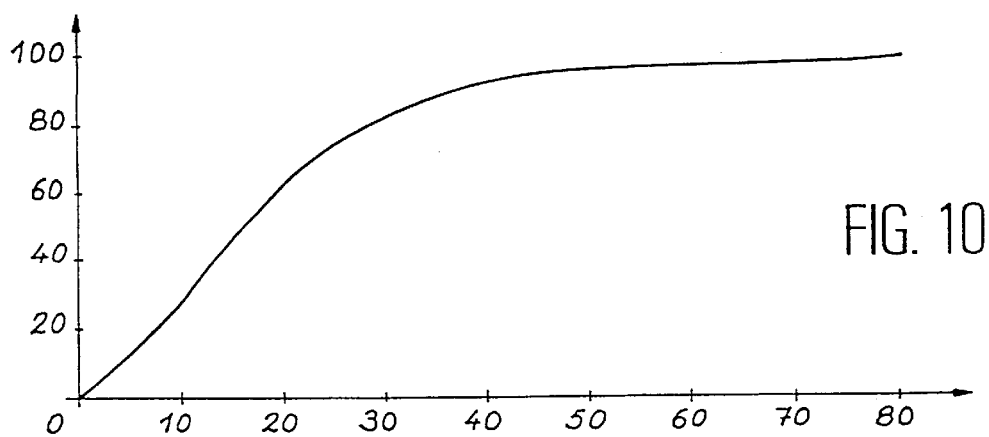

FIGS. 9 & 10 Respectively the evolution of the uranium concentration at the outlet of a column and the uranium percentage eluted from said column, as a function of the 2N nitric acid volume used for the elution.

Figure 11:
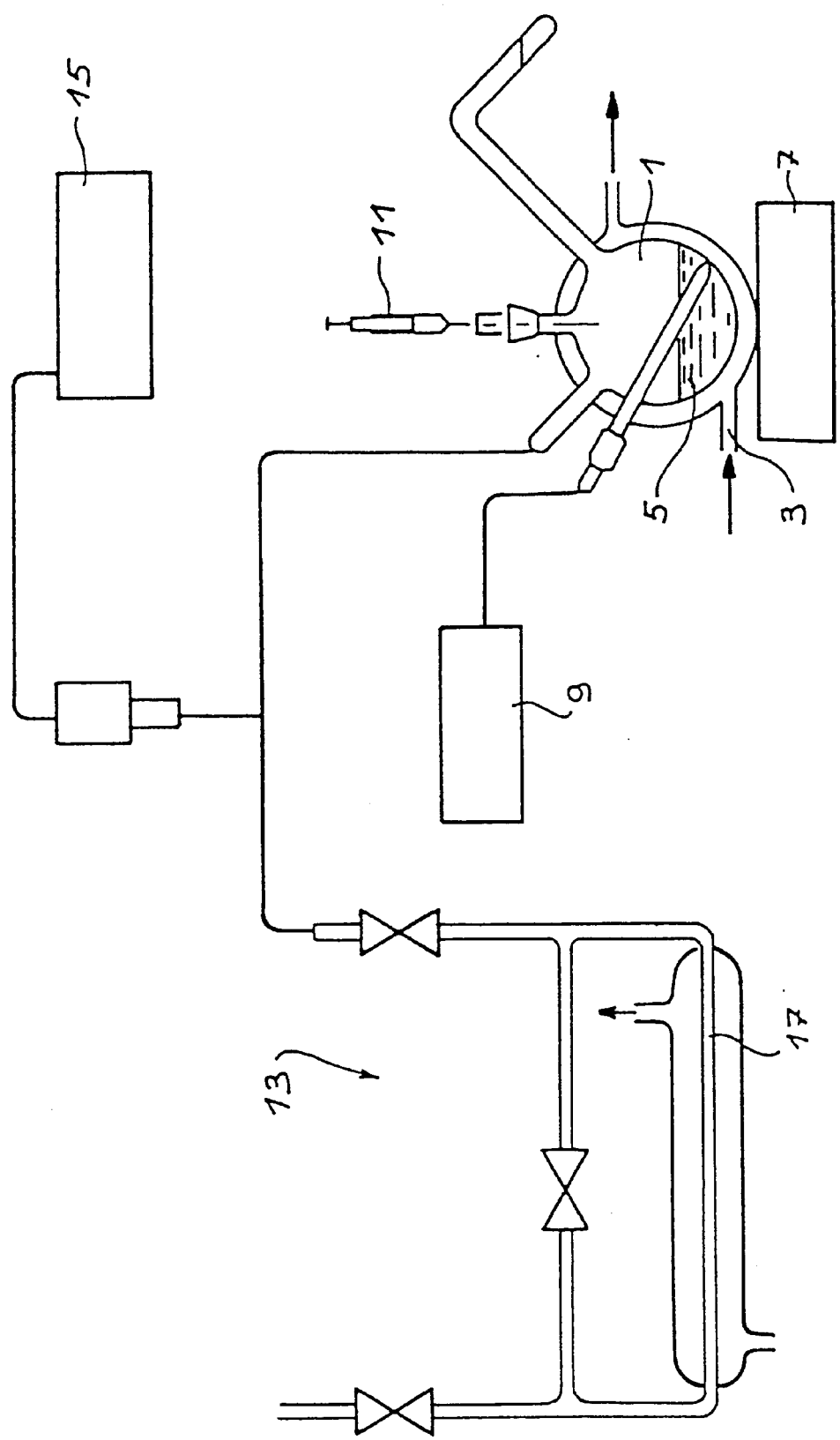

FIG. 11 A diagram illustrating an apparatus used during the fixing of oxygen by a complex according to the invention.

A number of examples of producing polyazacycloalkanes grafted to a silica gel and complexes according to the invention will now be described.

In the remainder of the description, the names of the polyazacycloalkanes according to the invention are given in abbreviated form for simplification reasons. More specifically, the polyazacycloalkanes having four nitrogen atoms are designated "$R_1$, a sequence of figures, $R_2$" and comply with the general formula:

(II)

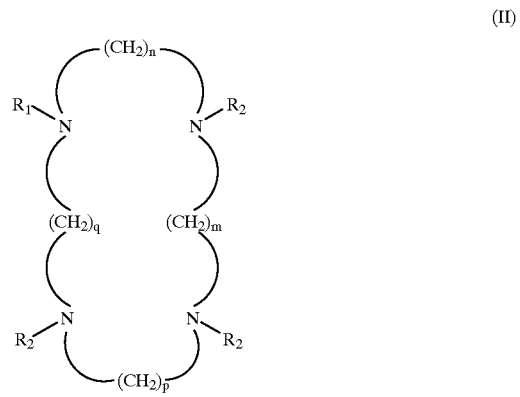

$R_1$ representing the support Si, Si hydroxy or Me, with Si meaning:

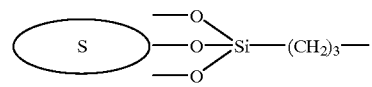

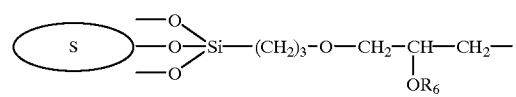

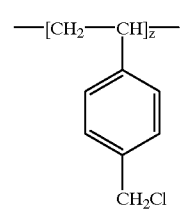

$R_2$ resenting TrP, TrA or TRMP, with

Trp meaning: $(CH_2)_2$—COOH

Tra meaning: $CH_2$—COOH and

TrMP meaning: $CH_2$—$PO_3H$

When no indication is given for $R_2$, it means that $R_2$=H.

When the sequence of figures is 2222 or 3333, this means that n, m, p and q are all equal respectively to 2 or 3. When the sequence of figures is 2323, this means that n and p are equal to 2 and m and q are equal to 3 or conversely n and p are equal to 3 and m and q are equal to 2.

Polyazacycloalkanes with 3 or 5 nitrogen atoms are designated in a similar way. Thus, the sequence of figures 232 means teat among n, m and p, two of these letters represent 2 and the other represents 3.

EXAMPLE 1

Synthesis of Si2323

To a suspension of 50.0 g of silica in gel form ((Kieselgel 60, Merck, 35–70 mesh) previously dried at 150 to 170° C. for 3 to 4 hours in vacuo)) in 500 ml of m-xylene, are added 9.0 g of 3-chloropropyl triethoxysilane (0.038 mole) and 7.5 g of 1,4,8,11-tetracyclotetradecane (cyclame) (0.038 mole). The reaction medium is refluxed in a single-neck flask surmounted by a condenser for approximately 12 hours. The silica balls are then filtered, protected from moisture, washed with toluene and then acetone and then dried in vacuo for 5 to 6 hours (the halls have a slightly yellowish appearance).

By elementary analysis of the carbon, nitrogen and hydrogen elements and by electron paramagnetic resonance (EPR) analysis, following the metallation of the cyclame grafted on silica by copper acetate in hot methanol, the number of millimoles of cyclame grafted per gram of support is quantified by dosing the copper element by EPR. This ratio is approximately 0.4.

Elementary analysis: %N=2.29 (equivalent to 0.4 mmole of cyclame per gram of silica).

EPR analysis: 0.411 mmole of cyclame per gram of silica.

Another preparation example is described below.

EXAMPLE 2

Synthesis of Si hydroxy 2323

Initially, drying takes place in vacuo at 100° C. and for 18 hours of 5 g of silica gel (Kieselgel 60, Merck, size 35 to 70 mash). This is followed by the addition under an argon atmosphere of 50 ml of freshly distilled toluene, 7 m of 3-glycidyloxy-propyl-trimethoxysilane and 0.15 ml of triethyl amine. The reaction medium is then refluxed for 12 hours. After cooling to ambient temperature, the modified silica gel (Si-GDP) is then washed with 70 ml of anhydrous toluene, 100 ml of acetone and 100 ml of diethyl ether.

This is followed by the addition to a suspension of 1 g of the modified silica obtained (Si-GDP in 275 ml of distilled water), of 0.6 g of 1,4,8,11-tetraazacyclotetradecane (cyclame). The reaction medium is refluxed for 12 hours. After cooling to ambient temperature, the modified silica gel Si hydroxy 2323 is filtered and washed numerous times with distilled water.

The product obtained is in the form of balls with a grain size of 35 to 70 mesh and the EPR analysis gives 0.36 mmole of cyclame per gram of silica.

An example of substituting a polyazacycloalkane grafted on a silica gel is described below.

EXAMPLE 3

Synthesis of Si2323Trp

To a suspension of 50.0 g of silica gel modified by cyclame (0.4 mmole of cyclame/g of resin obtained in the manner described in example 1) and 750 ml of absolute ethanol, are added dropwise and accompanied by vigorous stirring, 100 g of acrylic acid (1.5 mole) dissolved in 25C ml of absolute ethanol. The reaction medium is kept at ambient temperature during addition and is then refluxed for 12 hours. The mixture is filtered and the balls are washed with ethanol, diethyl ether and then acetone. The thus modified silica gel is then dried in vacuo for 10 hours.

The elementary analysis of carbon, nitrogen and hydrogen confirms the presence of 0.4 mmole of cyclame trisubstituted by propionate groups (—$CH^2$—$CH_2$—$CO_2H$) per gram of resin. The infrared spectroscopic study of the material suspended in nujol reveals the presence of C=O and C—O—H bonds.

Elementary analysis

%N=2.30 equivalent to 0.4 mmole of cyclame/gram of silica. %C=11.46 (theory 10.80%), %H=2.24 (theory 1.68%), Infrared analysis: C—O 1733 $cm^{-1}$ C—O—H 1405 $cm^{-1}$ Two examples of the preparation of polyazacycloalkanes of formula (II) in which $R_2$ represents $(CH_2)$—$R_5$ are described below.

EXAMPLE 4

Synthesis of Si2323TrA

A polyazacycloalkane of formula (II) in which $R_1$ is a silica derivative of formula:

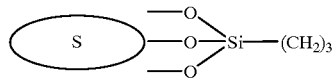

$R_2$ representing $CH_2$—COOH and n, p=2 and m, q=3 or conversely was synthesized reacting Si2323 with bromoacetic acid.

The substitution of the nitrogen atoms remaining free of the macrocycle was brought about by opposing derivative Si2323 to the halogen product in acetonitrile in the presence of potassium carbonate and a phase transfer agent. Refluxing took place for 12 hours, followed by the filtration, washing and drying of the expected product. This product is characterized by EPR analysis, elementary analysis and IR spectroscopy. The results are given below.

| EPR analysis cycle mequivalent/support gram | Elementary analysis cycle mequivalent/support gram | Infrared analysis |
|---|---|---|
| 0.25 | 0.245 | I.R. : v(C=0) = 1736.8 $cm^{-1}$ |

EXAMPLE 5

Synthesis of Si2323TrMP

A polyazacycloalkane of formula (II), in which $R_1$ is a silica derivative of formula:

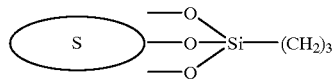

$R_2$ representing $CH_2$—$PO_3H$ and n, p=2 and m, q=3 or conversely was synthesized by reacting the compound Si2323 with phosphorous acid and formaldehyde. Compound Si2323 was opposed to these two reagents in an acid aqueous solution. The mixture was refluxed and then the expected product was isolated by filtration, washing and drying. This compound is characterized by EPR analysis, elementary analysis and NMR C.P. mass. The results are given below.

| EPR analysis cycle mequivalent/support gram | Elementary analysis cycle mequivalent/support gram | NMR C.P. mass |
|---|---|---|
| 0.29 | 0.255 | NMR ($^{31}$P): $\delta$ = 12.1 ppm |

Two examples for the preparation of tri- and penta-azacycloalkanes are given below.

EXAMPLE 6
Synthesis of Si232

After drying in vacuo at 150° C. for 3 hours 5.0 g of silica gel (Kieselgel 60, Merck, 35 to 70 mesh), addition took place of 50 nil of xylene, 1.80 g of 3-chloropropyl triethoxysilane (0.0075 mole) and 2.0 g of 1,4,8-triazacyclododecane. The reaction medium was then refluxed for 12 hours. The silica grains were then filtered protected from moisture, washed with toluene and acetone and then dried for several hours in vacuo. Quantification takes place by EPR.

EXAMPLE 7
Synthesis of Si22332

After drying in vacuo at 150° C. for 3 hours 5.0 g of silica gel (Kieselgel 60, Merck, 35 to 70 mesh) addition took place of 50 ml of xylene, 1.80 g of 3-chloropropyl triethoxysilane (0.0075 mole) and 1.0 g of 1,4,7,11,15-pentaazacyclooctadecane. The reaction medium was then refluxed for 12 hours. The silica grains were filtered protected from moisture, washed with toluene and acetone and then dried for several hours in vacua. Quantification took place by EPR.

Examples of the preparation of the complexes are given below.

These complexes can be synthesized from an unsubstituted polyazacycloalkane grafted on a solid support corresponding to one of the aforementioned formulas (VII), (VIII) or (IX), by adding an equivalent of $CoCl_2$, $6H_2O$ in suspension in water, in the case of a cobalt complex. After a reaction time of approximately 12 hours the solid support (silica or Merrifield resin) is filtered and dried.

The complexes can be prepared in the following way.

EXAMPLE 8
Metallation reaction of Si2323 by a cobalt salt under an inert atmosphere The silica gel Si2323 is suspended, under argon and hot for 10 hours with powerful stirring, in a methanol solution saturated with cobalt II acetate. The excess cobalt acetate is eliminated by washing with methanol, following filtration in argon, of the thus complexed silica gel.

The recording in argon of the electron parametric resonance spectrum makes it possible to prove that the metallation reaction is effective.

EXAMPLE 9
Metallation reaction of Si2323 by a copper salt

The silica gel Si2323 is suspended, hot, for 10 hours and with powerful stirring, in a methanol solution saturated with copper II acetate. The excess copper acetate is eliminated by washing with methanol the thus complexed silica gel.

The recording of the electron parametric resonance spectrum proves that the metallation reaction is effective.

EXAMPLE 10
Metallation reaction of Si2323 by a lead salt

The silica gel Si2323 is suspended, hot, for 10 hours and with powerful stirring in a methanol solution saturated with lead II acetate. The lead acetate excess is eliminated by washing with methanol after filtration the thus complexed silica gel. Elementary analysis proves that the metallation reaction is effective.

EXAMPLE 11
Determination of the partition coefficient Kd on the basis of synthetic uranium solutions Tests for fixing actinides to different macrocycles grafted on a support and which may or may not be substituted were carried out by determination of the partition coefficient Kd.

Among the different ways of defining the partition coefficient, the following formula was retained:

Kd={[fixed solute moles]/[gram of product analyzed]}/{[remaining solute moles]/[milliliter of solution]} i.e. for a solute S:

$$Kd = \frac{[So] - [S]}{[S]} \times \frac{V}{m}$$

in which
[So]=activity of S in the initial solution
[S]=activity of S in the liquid phase after contact
V=solution volume introduced on the silica gel or Merrifield resin (in milliliters)
m=mass of silica gel or Merrifield resin introduced (in grams).

Operating procedure

The Kd is determined using an approximately 1.5 g/l uranium 238 solution. The tests were performed with 500 mg of silica gel at 23° C. The stirring time is 3 minutes and the rest time 18 hours.

The results obtained are given in the following table 1.

TABLE 1

| Product | Partition coefficient (Kd) |
|---|---|
| Merrifield resin alone | 10 |
| Me2323 | 10 |
| Me2323TrP | 20 |
| Silica alone | 52 |
| Si2323 | 52 |
| Si2323TrP | 100 |

The product giving the best result in the above example, i.e. Si2323TrP, was then tested by varying the experimental pH, stirring time and temperature conditions.

a) Study of the partition coefficient (Kd) as a function of the pH on a synthetic uranyl nitrate solution Operating procedure:

Accurate weighing takes place of 0.1 g of Si2323TrP, which is placed in flasks. Into each of these are poured 15 ml of uranyl nitrate solution with a concentration of 1.6 g/l, adjusted to different pH values with 1.0 N soda, followed by stirring for 3 minutes at ambient temperature (23° C.). The flasks were left without stirring for 18 hours, so as to ensure an adequate contact time between the silica gel and the synthetic uranyl nitrate solution. The solutions are then filtered and the filtrates analyzed by plasma emission spectrometry.

Results:

The results obtained are given in the attached FIG. 1. It can be seen that the pH of the treated solution must exceed 3 in order to start to obtain an extraction of uranium by silica gel. The partition coefficient Kd is close to 50 for a pH above 4.3. Finally, under optimum pH conditions, i.e. for a pH equal to or above 5, a partition coefficient of approximately 100 is observed. This is particularly advantageous during the industrial performance of a treatment process using Si2323TrP, because the effluents present upstream of an evaporation tower generally have a pH above or around 7 and the effluents from said tower have a pH above 4.5.

b) Study of the partition coefficient (Kd) as a function of the stirring time on a synthetic uranyl nitrate solution Operating procedure:

Precise weighing took place of 0.1 g of Si2323TrP, which was placed in flasks. Into each of them were poured 15 ml of uranyl nitrate solution with a content close to 1.6 g/l adjusted to pH=4.82, followed by stirring for variable times and at ambient temperature (23° C.). The flasks are directly filtered and the filtrates analyzed by plasma emission spectrometry.

Results:

The curve giving the partition coefficient Kd as a function of the stirring time is plotted (cf. FIG. 2). By extending the stirring time, the uranium content of the treated solution can be lowered by a factor of five. This result makes it possible to define the maximum residence time in the column for obtaining a maximum efficiency, said time being between 10 and 30 minutes.

c) Study of the partition coefficient (Kd) as a function of the temperature on a synthetic uranyl nitrate solution Operating procedure:

Exact weighing takes place of 0.1 g of Si2323TrP, which is placed in flasks. Into each of them is poured 15 ml of uranyl nitrate solution with a concentration close to 1.6 g/l adjusted to pH=4.82, followed by stirring for 2 minutes at variable temperatures. The flasks are left for 15 minutes without stirring and at the same temperature. The solutions are then filtered and the filtrates analyzed by plasma emission spectrometry.

Results:

Plotting takes place of the curve giving the partition coefficient Kd as a function of the temperature of the medium during the experiment (cf. FIG. 3). The partition coefficient increases with the temperature (gain by a factor of 2) when the temperature passes from 20 to 60° C.

d) Measurement of the partition coefficient of different macrocycles according to the invention Different macrocycles grafted on silica gel and in substituted or unsubstituted form were tested in order to measure their respective partition coefficient compared with a synthetic uranyl nitrate solution. The results are obtained are given in the following table 2.

TABLE 2

| Material | Si2222 | Si2323 | Si3333 |
|---|---|---|---|
| Partition coefficient Kd | 45 | 41 | 49 |
| Material | Si2222TrP | Si2323TrP | Si3333TrP |
| Partition coefficient Kd | 100 | 74 | 61 |
| Material | Si2323TrA | Si2323TrMP | Sihydroxy2323TrP |
| Partition coefficient Kd | 298 | 420 | 807 |

For comparison purposes, the partition coefficient of silica alone is between 40 and 50.

On varying the size of the cavity of the macrocycles having no substituents, it can be seen that the partition coefficient varies between 40 and 50, which is equivalent to the value found on silica gel alone. However, with regards to the materials having propionate (TrP), there is on average a doubling of the extraction capacity and the macrocycle with the smallest cavity (n, m, p and q equal to 2) would seem to be the most effective.

On considering a given macrocycle size, by varying the length and nature of the substituents of the macrocycle, there is a considerable increase to the extraction capacity, particularly with regards to Sihydroxy2323TrP. Si2323TrMP, carrying phosphorus atoms, is also very effective.

EXAMPLE 12

Tests for fixing a metal in the static mode a) Elution test of a metal fixed to a silica gel Si2323TrP by means of a nitric acid solution Accurate weighing takes place of 0.1 g of silica gel Si2323TrP, which is placed in a flask, followed by the addition of 15 ml of a synthetic uranyl nitrate solution (A) with a content close to 1.6 g/l and adjusted to pH of 4.82. The solution is stirred for 3 minutes at ambient temperature (23° C.) and then the mixture is left, without stirring, for a contact time of 18 hours. The solution is filtered so as to separate it from the gel. This filtrate is analyzed by plasma emission spectroscopy so as to deduce therefrom the value of Kd.

This is followed by washing with distilled water of the silica gel Si2323TrP which has fixed the uranium, it is returned to a flask and addition takes place of 5 ml of a 1N nitric acid solution. This is followed by stirring for 3 minutes at ambient temperature, then the acid solution is filtered and analyzed so as to determine the eluted uranium percentage in this acid solution.

The above operating procedure is also carried out in parallel with 1.5N, 2.0N, 2.5N, 3.0N and 5.0N nitric acid solutions. The results obtained are given in FIG. 4. It can be seen that a nitric acid normality above 2 is adequate for obtaining an elution of at least 90% of the uranium.

The above operating procedure is carried out in parallel with 2.0N nitric acid solutions and varying the contact time between the silica gel which has fixed the uranium and the nitric acid solution between 10 and 480 s. The results obtained are illustrated in FIG. 5. It can be seen that a contact time of about 1 minute is adequate for eluting the uranium.

b) Test of fixing uranium 238 by silica gel Si2323TrP and eluting the latter with a nitric acid solution Accurate weighing takes place of 1 g of silica gel Si2323TrP, which is placed in a flask, followed by the addition of 50 ml of a synthetic uranyl nitrate solution (A) with a content close to 2 g/l and adjusting to a pH of 4.82. The solution is stirred for 5 minutes at ambient temperature (23° C.) and then the mixture is left without stirring for a contact time of 90 minutes. The solution is then filtered so as to separate it from the gel. The filtrate is analyzed by plasma emission spectroscopy so as to deduce therefrom the value of Kd.

The silica gel Si2323TrP is then washed with distilled water, returned to a flask and 20 ml of a 2N nitric acid solution is added, followed by stirring for 15 minutes at ambient temperature. The acid solution is filtered and analyzed by plasma emission spectroscopy in order to deduce the Kd. The gel is isolated, washed and dried and then said sample is placed in a flask containing 15 ml of synthetic solution (A) for undergoing 9 treatments identical to that described hereinbefore.

The results obtained after 10 extraction cycles and after 10 elution cycles are respectively illustrated in FIGS. 6 and 7.

It can be seen that there is an almost complete regeneration of the silica gel Si2323TrP and its extraction capacity remains virtually unchanged even after 10 operating cycles, which is favourable for industrial implementation. It is possible to see the poor result of the second extraction cycle in FIG. 6 due to an incomplete regeneration of the material.

EXAMPLE 13
Fixing test of a metal in the dynamic mode

Tests were also carried out during a dynamic process consisting of placing Si2323TrP in a column and percolating the effluent to be treated.

Experimental apparatus

In all the following tests use is made of a glass column with a diameter of 1.5 cm and a height of 30 cm, containing 30 g of silica gel Si2323Trf placed between a sintered part and polytetrafluoroethylene (Teflon, registered trademark). The column can be supplied either from the bottom or the top using calibrated tubes. During the decontamination process, the contaminated α effluent supply takes place from the bottom of the column at a speed of approximately $2.8.10^{-2}$ cm/s (approximately 180 ml/h), which corresponds to a residence time of the effluent to be treated of approximately 18 minutes.

a) Test of fixing uranium 238 present in a real effluent from an industrial evaporation tower In this test treatment takes place of 15 liters of an effluent containing as the radioactive element solely uranium 238 at a concentration of 0.6 $\mu$g/l.

This effluent is passed through the aforementioned silica gel Si2323TrP column. The initial effluent and the effluent obtained after passing over Si2323TrP are analyzed by plasma mass spectrometry (I.C.P.M.S.). The final uranium 238 concentration of the effluent after passing onto the silica gel is 0.02 $\mu$g/l, which shows that virtually all the uranium present in the initial effluent was absorbed on the silica gel Si2323TrP following a single passage through the column. (Si2323TrP retained a minimum of approximately 96.7% of the initial uranium present). Thus, this effluent was completely purified with respect to the α emitter element. The prior art procedures do not permit such a uranium purification.

The detection limit of this procedure during the test is 0.2 $\mu$g/l.

b) Test of fixing uranium 238 present in a synthetic uranyl nitrate solution

In the two following cases treatment takes place of 2 liters of a solution containing uranium 238. The initial effluent and the treated effluent, obtained after passage on silica gel Si2323TrP were dosed by plasma mass spectrometry (I.C.P.M.S.). The results obtained are given in table 3.

TABLE 3

| Effluent to be treated (U 238) | 180 $\mu$g/l | 1306 $\mu$g/l |
|---|---|---|
| Treated effluent (U 238) | ≦0.02 $\mu$g/l | ≦0.02 $\mu$g/l |
| Uranium 238 percentage fixed on silica gel Si2323TrP | 99.9% | 99.9% |

The detection limit of this method during the test is 0.02 $\mu$g/l.

c) Fixing test of uranium, cerium and europium present in a synthetic solution

In this test treatment takes place of 1.4 liter of a solution containing 53 mg/l of uranium, 45 mg/l of cerium and 17 mg/l of europium on a Si2323TrP silica gel column. Regular samplings take place at the column outlet and these solutions, as well as the initial solution are analyzed by plasma emission spectrometry. The evolution of the concentration of the different cations at the column outlet as a function of the initial solution volume which has flown out is represented in FIG. 8. It can be seen that a first cation ($Ce^{3+}$) is detected after approximately 200 ml of solution have flown out, which corresponds to approximately 30 mg of cations (uranium, cerium and europium) fixed for 30 g of silica Si2323TrP contained in the column prior to the saturation thereof and a cationic element to be eliminated is no longer fixed.

The three cation types were then eluted by a 2N nitric acid solution and the results obtained in the case of eluting uranium are shown in FIGS. 9 and 10. FIG. 9 shows that permanent operating conditions are firstly established (left-hand part of the curve) and then there is a continuous decrease of the uranium content in the silica gel Si2323TrP (right-hand part of the curve) as the nitric acid volume introduced into the column increases.

d) Fixing test of plutonium 239 and americium 241 present in a real effluent from an industrial evaporation tower In this test treatment takes place of 15 liters of an effluent containing 62 $Bq/m^3$ of plutonium 239 and 213 $Bq/m^3$ of americium 241. The effluents before and after passing onto the Si2323TrP silica gel column are analyzed by α counting. The effluent obtained contains at the most 2 $Bq/m^3$ of plutonium and 2 $Bq/m^3$ of americium, which corresponds to the detection limit. Thus, the silica gel retains at least respectively 96.8% of the plutonium and 99.1% of the americium.

Virtually all the actinides present in the effluent before the treatment were fixed to the silica gel Si2323TrP and that the effluent, after passing on the column, was completely purified with respect to α emitting elements within existing detection limits.

a) Analysis of various cations present in the effluents before and after passing onto a Si2323 or Si2323TrP silica gel column A quantitative and qualitative analysis of the cations present in solution before and after passing on a column filled with silica gel Si2323 or Si2323TrP was carried out in order to determine the different elements which can be retained by the column. The following cations were tested: Na, Mg, Ca, Sr, Ba, Si, Al, Ga, Pb, Hg, Ti, Cr, Mn, Fe, Ni, Cu, Zn, Cd, Ta and Au.

The results obtained are illustrated in table 4.

TABLE 4

| Elements | Na | Mg | Ca | Sr | Ba |
|---|---|---|---|---|---|
| Cation content in mother solution (mg/l) | 400 | 2 | 71 | 0.06 | 0.7 |
| Cation content in eluted solution (mg/l) after passage on: | | | | | |
| silica gel | 395 | 1.8 | 73 | 0.06 | 0.6 |
| Si2323 | 402 | 1.82 | 77 | 0.06 | 0.62 |
| Si2323TrP | 397 | 1.76 | 71 | 0.06 | 0.6 |
| Elements | Si | Al | Ga | Pb | Hg |
| Cation content in mother solution (mg/l) | 13 | 1.12 | 0.02 | 0.17 | 0.03 |
| Cation content in eluted solution (mg/l) after passage on: | | | | | |
| silica gel | 47 | 1.09 | 0.02 | 0.15 | 0.03 |
| Si2323 | 36 | 1.09 | 0.02 | 0.15 | <LD |
| Si2323TrP | 32 | 1.12 | 0.02 | 0.15 | <LD |

TABLE 4-continued

| Elements | Ti | Cr | Mn | Fe | Ni |
|---|---|---|---|---|---|
| Cation content in mother solution (mg/l) | 0.36 | 0.05 | 0.04 | 4.6 | 0.06 |
| Cation content in eluted solution (mg/l) | | | | | |
| silica gel | 0.34 | 0.03 | 0.04 | 4.07 | 0.06 |
| Si2323 | 0.26 | 0.03 | 0.04 | 2.89 | 0.06 |
| Si2323TrP | 0.27 | 0.03 | 0.05 | 2.82 | 0.06 |

| Elements | Cu | Zn | Cd | Ta | Au |
|---|---|---|---|---|---|
| Cation content in mother solution (mg/l) | 1.16 | 4.1 | 0.08 | 1.8 | 0.03 |
| Cation content in eluted solution (mg/l) | | | | | |
| silica gel | 1.02 | 3.65 | 0.06 | 0.03 | <LD |
| Si2323 | 0.67 | 3.6 | 0.06 | <LD | <LD |
| Si2323TrP | 0.03 | 3.6 | <LD | <LD | <LD |

LD: detection limit close to 0.03 mg/l.

It is found that only certain elements such as copper, cadmium, mercury, tantalum and gold are trapped on the column. However, alkali metal and alkaline earth elements, always present in effluents (and particularly sodium) are not trapped. Therefore the column is not excessively rapidly saturated and does not lose its effectiveness.

EXAMPLE 14

Tests of fixing metals to a semi-pilot installation
Experimental apparatus

This apparatus is identical to that described in example 13, except that the column has a diameter of 4.5 cm and a height of 105 cm, retaining 1800 g of silica gel Si2323TrP and the flow rate of the effluent is approximately 10 l/h.

Fixing test of plutonium, americium and uranium present in a real effluent from an industrial evaporation tower.

In this test, two samples of 1 m³ of effluent were treated in the aforementioned experimental apparatus. The results obtained are given in table 6.

TABLE 6

| | Metals | | | | | |
|---|---|---|---|---|---|---|
| Nature of effluent | Effluent to be treated | Treated effluent | Effluent To be treated | Treated effluent | Effluent to be treated | Treated effluent |
| First Sample | 20 | <5 | 10 | <5 | 208 | <0.1 |
| Second sample | 28 | <5 | 210 | <5 | 0.4 | <0.1 |

Here again, it is found that the modified silica gal used fixed a considerable part of the metals present.

EXAMPLE 15

Test on alkali metal effluents with a high plutonium and americium content

In this test treatment took place of 1/2 liter of a highly charged solution containing 19840 kBq/m³ of plutonium 239 and 750 mBq/m³ of americium 241. The initial effluent and the effluent obtained after passing on a column containing Si2323TrP are analyzed by α counting. The treated effluent has a concentration of 376 kBq/m³ of plutonium 239 and 24 kBq/m³ of americium 241. The depletion factor is 53 for plutonium and 31 for americium.

A qualitative and quantitative analysis of the cations present in the initial effluent and in the effluent obtained after passing on a silica gel and on Si2323TrP was carried out. Analysis was carried out by plasma torch. The results are given in table 5.

In this experiment, bearing in mind the use of a very highly plutonium and americium charged solution, the latter should have been treated on a column filled solely with silica gel and containing no grafted polyazacycloalkane before being treated on Si2323TrP.

In general terms, any process using one of the aforementioned polyazacycloalkanes for the elimination of metal cations can be preceded by a treatment process on silica gel alone. In this case, the effluent to be treated is passed on a silica gel with a grain size between 35 and 70 mesh.

The treated effluent has a pH equal to or higher than 3 and preferably equal to or higher than 4.5. The contact time between the effluent and the silica gel is a t least one minute or preferably between 1 and approximately 30 minutes. The polluting elements are reextracted from the silica gel by a 1 to 5N nitric acid solution.

TABLE 5

| Cations | Cation content in the effluent to be treated (mg/l) | Cation content in the treated effluent after passage on silica gel (mg/l) | Cation content in the treated effluent after passage on Si2323TrP (mg/l) |
|---|---|---|---|
| Na | ≈50000 | ≈50000 | ≈50000 |
| Mg | 1 | 1 | 1 |
| Ca | 2 | 2 | 2 |
| Al | 1 | 1 | 1 |
| Si | 20 | 36 | 20 |
| Mn | 3 | 3 | 3 |
| Fe | 380 | 290 | 350 |
| Cd | 17 | 17 | 11 |

This shows the good selectivity of the silica gel and the modified silica 30 gel, which do not retain the aforementioned cations.

EXAMPLE 16

$O_2$ fixing test on a cobalt II tetraazamacrocyclic complex
Operation procedure:

The sys tem used is illustrated in FIG. 11. It comprises a thermostatically controlled 3 flask 1 containing the reagent solution 5. This flask is placed on a magnetic stirring device 7. The flask is also equipped with a pH-meter 9 and pH adjusting means 11. The flask 1 is connected to a pressure sensor 13 equipped with a recording device 15. The pressure sensor incorporates a measurement pointer 17 moving in translation in a tube.

The complex used is of the aforementioned formula (V), in which $R_1$ is silica, $R_2$ hydrogen, M cobalt II and n and p are equal to 2 and m and q are equal to 3 or vice versa.

Suspension takes place in the thermostatically controlled flask 1 of 0.500 g of modified silica gel in 16 cm³ of distilled water and 2 cm³ of KCl at 1 mole/l. One equivalent of $CoCl_2$, $6H_2O$ dissolved in 2 cm³ of distilled water is introduced into the flask.

The system is then isolated and at t=0 addition takes place to the suspension of the cobalt salt solution. The complexing and oxygenating reactions take place jointly leading to a dioxygen consumption and the displacement of the mercury index so as to reestablish atmospheric pressure within the system. At regular time intervals (t), the mercury index position is noted. Following calibration with a 1 cm³ gas syringe, determination takes place of the fixed dioxygen quantity ($n_{O2}$) per mole of complex ($n_C$) at a given t. The results obtained on the modified silica gel by two grafting procedures (corresponding respectively to the preparation process of a polyazacycloalkane grafted on a silica gel according to the first or second embodiment described hereinbefore) are given in the following table 6.

TABLE 6

|  | Polyazacycloalkane according to the first embodiment | Polyazacycloalkane according to the second embodiment |
|---|---|---|
| meq of complex/g ($n_c$) | 0.41 | 0.36 |
| Number of moles of $O_2$ fixed/g ($n_{O2}$) | $6.18 \cdot 10^{-5}$ | $7.68 \cdot 10^{-5}$ |
| % $n_{O2}/n_c$ (complex hypothesis 100% superoxo) | 15 | 21 |

The electron paramagnetic resonance spectrum of the oxygenated complexes recorded in the solid matrix at 100 K is characteristic of oxygenated species of the superoxo type. For the calculation of the $n_{O2}/n_C$ ratio, the hypothesis was made that the oxygenated complex was entirely in superoxo form.

What is claimed is:

1. A process of removing oxygen from a gaseous mixture containing oxygen comprising the step of contacting said gaseous mixture containing oxygen with a tri-, tetra- or penta-azamacrocyclic complex of transition metals of formulas (IV), (V) or (VI):

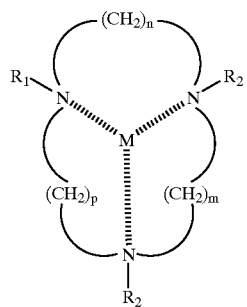

(IV)

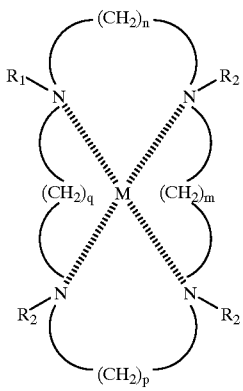

(V)

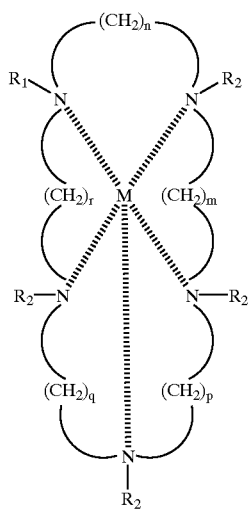

(VI)

in which n, m, p, q and r, which can be the same or different, are equal to 2 or 3, M is a transition metal that is selected from the group consisting of Ti, Mn, Fe, Co, Ni, Cu, Ru, Rh and Ir, $R_1$ is a solid support and $R_2$ represents a hydrogen atom or the group $(CH_2)_2$—$R_3$, $R_3$ is a functional group that is selected from the group consisting of COOH, $CONH_2$, $CH_2OH$, CN and $COOR_4$, $R_4$ representing an alkyl or benzyl group, or $R_2$ representing $(CH_2)$—$R_5$, $R_5$ representing COOH or $PO_3R_6$, and $R_6$ representing hydrogen or an alkyl group.

2. The process according to claim 1 wherein $R_1$ is a solid support comprising a crosslinked or non-crosslinked organic polymer or is a solid support derived from silica and having the formula:

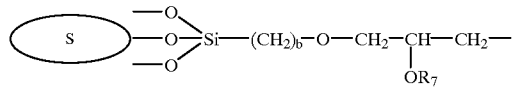

or the formula:

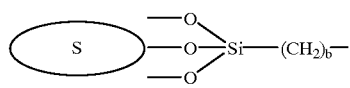

S representing a silica gel, b is an integer between 1 and 4, and $R_7$ an alkyl group or a hydrogen atom.

3. The process according to claim 2 wherein $R_1$ is a solid support derived from silica and b is 3.

4. The process according to claim 1 wherein the solid support is a radical of a crosslinked or non-crosslinked, organic polymer with an alkyl halide termination.

5. The process according to claim 1 wherein M is Co.

6. The process according to claim 1 wherein the tri-, tetra- or penta-azamacrocyclic complex is in solution.

* * * * *

UNITED STATES PATENT AND TRADEMARK OFFICE
CERTIFICATE OF CORRECTION

PATENT NO.     : 6,174,505 B1                                                               Page 1 of 1
DATED          : January 16, 2001
INVENTOR(S)    : Roger Gúilard, Hervé Chollet, Philippe Guiberteau and Panayotis Cocolios It is certified that error appears in the above-identified patent and that said Letters Patent is hereby corrected as shown below:

<u>Title page,</u>
Item [73], Assignee, should read as follows: -- [73] Assignee: Commissariat a l'Energie Atomique and Air Liquide --

Signed and Sealed this

First Day of April, 2003

JAMES E. ROGAN
*Director of the United States Patent and Trademark Office*